(12) United States Patent
Chen et al.

(10) Patent No.: US 12,039,751 B2
(45) Date of Patent: Jul. 16, 2024

(54) ERROR COMPENSATION FOR A THREE-DIMENSIONAL TRACKING SYSTEM

(71) Applicant: Northern Digital Inc., Waterloo (CA)

(72) Inventors: Larry Chen, Fergus (CA); Drexel Lee Hallaway, Stonewall, TX (US); Shaulaine White, Cambridge (CA); Athanasios Tommy Balkos, Waterloo (CA)

(73) Assignee: Northern Digital Inc.

( * ) Notice: Subject to any disclaimer, the term of this patent is extended or adjusted under 35 U.S.C. 154(b) by 321 days.

(21) Appl. No.: 17/529,881

(22) Filed: Nov. 18, 2021

(65) Prior Publication Data

US 2022/0156966 A1 May 19, 2022

Related U.S. Application Data

(60) Provisional application No. 63/115,154, filed on Nov. 18, 2020.

(51) Int. Cl.
*G06T 7/70* (2017.01)
*G06T 7/73* (2017.01)

(52) U.S. Cl.
CPC ...... *G06T 7/73* (2017.01); *G06T 2207/10048* (2013.01); *G06T 2207/30204* (2013.01)

(58) Field of Classification Search
CPC ............. G06T 7/73; G06T 2207/10048; G06T 2207/30204; G06T 2207/30004;

(Continued)

(56) References Cited

U.S. PATENT DOCUMENTS

| 4,895,440 A | 1/1990 | Cain et al. |
| 5,559,627 A | 9/1996 | Harris et al. |

(Continued)

FOREIGN PATENT DOCUMENTS

| CN | 105792748 | 7/2016 |
| CN | 106714681 | 5/2017 |

(Continued)

OTHER PUBLICATIONS

[No Author Listed], [online], "DeepMoCap: Deep Optical Motion Capture using Depth Sensors and Retro Reflectors," Jan. 12, 2019, retrieved on Jul. 13, 2022, <https://www.youtube.com/watch?v=OvCJ-WWyLcM>, 29 pages [Video Submission].

*Primary Examiner* — Neil R McLean
(74) *Attorney, Agent, or Firm* — Fish & Richardson P.C.

(57) ABSTRACT

Tracking system for tracking one or more reflective markers includes at least two optical sensors configured to obtain image data of an environment that includes at least one marker. The tracking system obtains the image data from the at least two optical sensors. The tracking system is configured for extracting, from the image data, optical signatures representing reflections of the optical signal from at least one marker, determining optical centroids of the optical signatures of the at least one marker, estimating an initial pose for at least one marker, determining offset error vectors from the optical centroids of the at least one marker based on the initial pose, determining corrected optical centroids based on the offset error vectors and the optical centroids, and determining a corrected three dimensional position of the marker in the environment based on the corrected optical centroids of the marker.

20 Claims, 5 Drawing Sheets

(58) Field of Classification Search
CPC .. G06T 7/66; G06T 7/246; G06T 7/70; G06T 17/00
USPC ........................................................ 382/103
See application file for complete search history.

(56) References Cited

U.S. PATENT DOCUMENTS

| | | |
|---|---|---|
| 6,750,848 B1 | 6/2004 | Pryor |
| 8,086,026 B2 | 12/2011 | Schulz |
| 9,122,355 B2 | 9/2015 | Yoshida et al. |
| 9,182,524 B2 | 11/2015 | Smithwick et al. |
| 9,443,349 B2 * | 9/2016 | Wang ...................... G06T 19/20 |
| 10,657,704 B1 * | 5/2020 | Han ........................ G06T 19/20 |
| 11,158,087 B2 * | 10/2021 | Thyagharajan ........... G06T 7/73 |
| 2004/0212886 A1 | 10/2004 | Hubbs |
| 2006/0203343 A1 | 9/2006 | Modilevsky et al. |
| 2015/0097968 A1 | 4/2015 | Bergman et al. |
| 2016/0073962 A1 | 3/2016 | Yu et al. |

FOREIGN PATENT DOCUMENTS

| | | |
|---|---|---|
| CN | 108061908 | 5/2018 |
| CN | 110464301 | 11/2019 |
| JP | 2001074458 | 3/2001 |

\* cited by examiner

ERROR COMPENSATION FOR A THREE-DIMENSIONAL TRACKING SYSTEM

CLAIM OF PRIORITY

This application claims priority under 35 U.S.C. § 119(e) to U.S. Patent Application Ser. No. 63/115,154, filed on Nov. 18, 2020, the entire contents of which are hereby incorporated by reference.

TECHNICAL FIELD

This disclosure relates to error compensation for an optical tracking system.

BACKGROUND

Tracking systems typically rely on objects having one or more markers affixed thereto. The markers that are affixed to the object may be active markers (e.g., light emitting diode markers), passive markers or a combination of active and passive markers.

Generally, passive markers can be configured to reflect an optical signal toward a camera. The marker can be configured to reflect the optical signal on a parallel path back toward the signal source. In response to detection, by a camera, of an optical signal reflected from the marker, a tracking system can estimate a position of the marker in an environment.

In a medical application context, a user (e.g., a doctor) touches a surface of interest (e.g., a surface of a patient's body) using a distal tip of the tracked object (e.g., a probe or a surgical instrument.) An object sensing device views the marker(s) affixed to the object. On the basis of the known locations of the sensing device and the determined positions and orientations (e.g., poses) of the marker(s) as seen by the sensing device, such systems calculate the three-dimensional coordinates of the object(s) to which the marker(s) are affixed.

SUMMARY

This specification describes a tracking system that is configured to determine a position of a tracked object in an environment by estimating the pose(s) (e.g., positions and orientations) of a plurality of markers affixed to the tracked object. At least one marker provides a signal to sensors of a tracking system. The signal indicates the position and orientation (e.g., pose) of the markers in the environment, from which the pose of the tracked object can be estimated. The tracking system can be an optical tracking system, and the markers can be passive markers configured to reflect an optical signal to the tracking object. In some implementations, the markers can each include a retroreflective coating configured to reflect an optical signal towards a source of the optical signal. Generally, an optical sensor (e.g., a camera) is positioned near the source of the optical signal and configured to detect the reflected optical signal from the markers. A reflection (e.g., a glint) is detected on each of the markers. The tracking system is configured to estimate where the markers are in the environment based on where the reflected signal is detected. The pose of the tracked object is subsequently determined based on a predetermined relationship between the pose of each of the markers and the pose of the tracked object.

A marker (e.g., a passive marker) generally includes a geometric shape, and can be covered in a reflective coating. In some implementations, the marker can be a sphere. In some implementations, the marker can be a cylinder. The tracking system often includes a disk or sphere among the markers for the tracked object because, for these shapes, an optical centroid of the object in the two-dimensional image space (e.g., recorded in the sensor image plane) is in-line with a volumetric centroid of the object in three dimensional (3D) space when the marker is viewed from any angle. The volumetric centroid of the marker generally represents the position of the marker in 3D space. Alignment occurs assuming that the marker has perfect or near perfect retroreflective symmetry of light return. The alignment of the volumetric centroid and the optical centroid can enable simple triangulation of the position and orientation of a marker.

Retroreflective sphere markers have a wide (nearly complete) range of viewing angles for which they can be used without the optical centroid of the sphere varying from the volumetric centroid of the sphere as previously described. However, it can be difficult to create a low level of optical variability over the surface of a passive marker using a reflective coating. The variability can be a result of stretching a retroreflective material over a spherical surface of the passive marker. The variability reduces an overall accuracy of tracking the sphere.

Retroreflective disc targets are highly uniform in optical performance because it is easier to coat the disc evenly with a reflective material. The low variability in the reflective surface can result in a higher accuracy for tracking a disc-shaped marker, relative to a sphere-shaped marker. However, because discs have shallow viewing angles, they offer lower usability than spheres. Beyond a threshold viewing angle, discs are generally not visible.

Therefore, use of alternate geometry for a marker (e.g., a cylinder marker) can provide a wide viewing angle and also permit uniform coating of the reflective material onto the marker. However, for a range of viewing angles, the marker's optical centroid does not align with its volumetric centroid. The tracking system, therefore, performs a compensation to reduce or remove an error caused by a misalignment of the optical centroid in the image plane with the volumetric centroid representing the position of the marker in 3D space.

The tracking system is configured to compensate alternate geometric markers (e.g., cylindrical markers or other ruled surfaces) on a tracked device in order to precisely determine the pose of the tracked object. The tracking system is configured to use an iterative compensation process. Generally, the tracking system is calibrated based on the specific parameters of the markers of the tracked object, including their sizes, shapes, orientations, relative positions on the tracked object, and their reflective properties. When the object tracking begins, the tracking system does not require knowledge of an initial pose of the tracked object. Rather, an initial pose estimate is made based on images of the markers, and an offset error vector model is applied to correct the initial pose estimate. The offset applied is an estimate of the misalignment of the volumetric centroid and the optical centroid from the perspective of each of the plurality of the optical sensors and is based on the pose estimate of each marker. The correction model is generally continuous and accounts for any pose in the environment of the markers. Correction estimates are determined and applied to the initial optical centroids, which adjustment supports the computation of a corrected pose. The tracking system is configured to iterate the estimation process by using the updated pose estimate as the initial pose estimate for correction. The initial pose estimate becomes increasingly accurate in its representation of the true pose of the marker in the environment.

The implementations described herein can provide various technical benefits. For instance, the techniques described herein enable the tracking system to use cylindrical markers, which provide more accurate tracking due to lower surface variability, as previously described with respect to spheres, while maintaining wide viewing angles. This can allow for lower cost manufacturing processes for the markers and more accurate tracking systems overall.

Additionally, the tracking system described herein is configured to estimate a pose of the tracked object without requiring a known initial pose of the object or initialization process to be performed prior to tracking. For example, the tracking system can include a memory that is preloaded with parameters of the tracked object, such as the size, shapes, relative positions, etc. of the markers on the tracked object. The tracking system can immediately begin tracking by performing an initial estimate of the offset values for each marker based on the stored parameters.

The foregoing advantages can be realized by one or more of the following embodiments.

In a general aspect, a tracking system for tracking one or more reflective markers. The tracking system includes at least two optical sensors configured to obtain image data of an environment that includes at least one marker, wherein at least a portion of the at least one marker is configured to reflect an optical signal; and a processing device configured to obtain the image data from the at least two optical sensors. The processing device is configured to perform operations including extracting, from the image data, optical signatures representing reflections of the optical signals of the at least one marker; determining optical centroids of the optical signatures in the image data; estimating an initial pose of at least one marker in the environment based on the optical centroids; determining offset error vectors from the optical centroids of the at least one marker based on the estimate of the initial pose; determining corrected optical centroids of the at least one marker based on the offset error vectors and the optical centroids; and determining a corrected three dimensional (3D) position of the at least one marker in the environment based on the corrected optical centroids of the at least one marker.

In some implementations, estimating an initial pose of the at least one marker in the environment based on the optical centroids includes obtaining one or more optical sensor configuration parameters comprising one or more of a lens size, a focal length, and an optical sensor position in the environment for the at least two optical sensors; and estimating the offset error vectors of the markers of the plurality in the environment based on the one or more optical sensor configuration parameters.

In some implementations, the at least one marker is a first marker, and wherein estimating the initial pose of the at least one marker in the environment includes receiving spatial data representing a predetermined spatial relationship between the first marker and one or more additional markers of a plurality of markers, the first marker and the one or more additional markers being rigidly fixed relative to each other on a tracked object; extracting, from the image data, optical signatures representing reflections of the optical signal from the one or more additional markers; and based on the optical signatures of the one or more additional markers and the predetermined spatial relationship between the first marker and the one or more additional markers, estimating the initial pose of the first marker in the environment.

In some implementations, the tracking system includes an inertial measurement unit (IMU) configured to provide orientation data representing an orientation for the at least one marker. In some implementations, estimating the initial pose of the at least one marker is based on orientation data provided by the IMU.

In some implementations, determining the offset error vectors is further based on one or more parameters of the at least one marker, the one or more parameters comprising, for a given marker, a size of the given marker, a shape of the given marker, a relative position of the given marker with respect to at least one other marker if a plurality of markers are present, and a configuration of a reflective coating on the given marker.

In some implementations, the operations include using the corrected three dimensional position as a portion of the initial pose of the at least one marker in the environment; and determining the offset error vectors based on the corrected three dimensional position of the at least one marker by an iterative process.

In some implementations, the operations include, based on the corrected three dimensional position of the at least one marker, determining a pose of a portion of a tracked object in the environment. In some implementations, the at least one marker is fixed to the tracked object at predetermined locations on the tracked object.

In some implementations, the tracked object is a surgical tool. In some implementations, the portion of the tracked object is a working portion of the tool.

In some implementations, the at least one marker includes one of a circular cylinder with reflective sides only, circular cylinder with a reflective side and a reflective top, a convex conical marker, a concave conical marker, a concave semi-spherical marker, a convex semi-spherical marker, a disc marker, any marker having a ruled surface, and a spherical marker.

In some implementations, the at least one marker is one of a plurality of markers that are identical or nearly identical to each other in size or shape.

In some implementations, the at least one marker is one of a plurality of markers that are each unique from at least one other marker in the plurality in size or shape.

In some implementations, the optical signal comprises infrared (IR) or near IR radiation.

In a general aspect, a process performed by a computing system for tracking one or more reflective markers includes obtaining, from at least two optical sensors, image data of an environment that includes at least one marker, wherein at least a portion of the at least one marker is configured to reflect an optical signal; extracting, from the image data, optical signatures representing reflections of the optical signals of the at least one marker; determining optical centroids of the optical signatures in the image data; estimating an initial pose of at least one marker in the environment based on the optical centroids; determining offset error vectors from the optical centroids of at least one marker based on the estimate of the initial pose; determining corrected optical centroids of the at least one marker based on the offset error vectors and the optical centroids; and determining a corrected three dimensional (3D) position of the at least one marker in the environment based on the corrected optical centroids of the at least one marker.

In some implementations, estimating an initial pose of the at least one marker in the environment based on the optical centroids includes obtaining one or more optical sensor configuration parameters comprising one or more of a lens size, a focal length, and an optical sensor position in the environment for the at least two optical sensors; and estimating the offset error vectors of the markers of the plurality in the environment based on the one or more optical sensor configuration parameters.

In some implementations, the at least one marker is a first marker, and wherein estimating the initial pose of the at least one marker in the environment includes receiving spatial data representing a predetermined spatial relationship between the first marker and one or more additional markers of a plurality of markers, the first marker and the one or more additional markers being rigidly fixed relative to each other on a tracked object; and extracting, from the image data, optical signatures representing reflections of the optical signal from the one or more additional markers; based on the optical signatures of the one or more additional markers and the predetermined spatial relationship between the first marker and the one or more additional markers, estimating the initial pose of the first marker in the environment.

In some implementations, the process includes providing, by an inertial measurement unit (IMU), orientation data representing an orientation for the at least one marker, wherein estimating the initial pose of the at least one marker is based on orientation data provided by the IMU.

In some implementations, determining the offset error vectors is further based on one or more parameters of the at least one marker, the one or more parameters comprising, for a given marker, a size of the given marker, a shape of the given marker, a relative position of the given marker with respect to at least one other marker if a plurality of markers are present, and a configuration of a reflective coating on the given marker.

In some implementations, the process includes using the corrected three dimensional position as a portion of the initial pose of the at least one marker in the environment; and determining the offset error vectors based on the corrected three dimensional position of the at least one marker by an iterative process.

In some implementations, the process includes, based on the corrected three dimensional position of the at least one marker, determining a pose of a portion of a tracked object in the environment, wherein the at least one marker is fixed to the tracked object at predetermined locations on the tracked object.

In some implementations, one or more non-transitory computer readable media store instructions that, when executed by a computing system, cause the computing system to perform operations that include obtaining, by at least two optical sensors, image data of an environment that includes at least one marker, wherein at least a portion of the at least one marker is configured to reflect an optical signal; extracting, from the image data, optical signatures representing reflections of the optical signals of the at least one marker; determining optical centroids of the optical signatures in the image data; estimating an initial pose of at least one marker in the environment based on the optical centroids; determining offset error vectors from the optical centroids of the at least one marker based on the estimate of the initial pose; determining corrected optical centroids of the at least one marker based on the offset error vectors and the optical centroids; and determining a corrected three dimensional (3D) position of the at least one marker in the environment based on the corrected optical centroids of the at least one marker.

The details of one or more embodiments are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

This specification describes a tracking system that is configured to determine a pose (e.g., position and orientation) of a tracked object in an environment. The tracked object generally includes one or more markers configured to provide signals to a tracking system including a sensor configured to measure the signals from the markers. The signals indicate pose of the tracked object in the environment based on the pose of each of the markers. For example, the tracking system can be an optical tracking system, and the markers can be passive markers configured to reflect an optical signal to the tracking object. The passive markers can each include a retroreflective coating configured to reflect an optical signal along a parallel path back towards a source of the optical signal. Generally, an optical sensor (e.g., a camera) is positioned near the source of the optical signal and configured to detect the reflected optical signal from each of the markers. A reflection (e.g., a glint) is detected for each marker. The tracking system is configured to estimate where the passive marker is in the environment based on where the reflected signal is detected.

The marker generally includes a geometric shape, and can be covered in a reflective coating. The marker can be, for example, a cylinder. However, other shapes are possible. In some implementations, the marker generally includes a shape having a 3D surface around which a flat membrane can be wrapped without two dimensional (2D) distortion, stretching, wrinkling, or overlaps. This is to facilitate the application of a uniform reflective coating on the marker that has as perfect retroreflective light return as possible.

The marker reflects a signal (e.g., an infrared signal) to an optical sensor to provide an optical signature in image data captured by the optical sensor. The marker is associated with an optical centroid, which is a center of the marker's reflected signal in the two dimensional (2D) plane of the image. The marker is associated with a volumetric centroid, which represents a position of the marker in 3D space (e.g., in the tracking environment). For markers other than spheres or discs, at some viewing angles, the optical centroid and volumetric centroid are misaligned due to the geometric of the marker. In these situations, compensation is performed to correct the optical centroid to a corrected position in the 2D image space so that an accurate 3D position of the marker can be estimated from the image data. The corrected optical centroid of each marker represents an estimation of an optical centroid that is in alignment with the volumetric centroid of the marker. The corrected optical centroids of the markers together enable triangulation of the pose of a tracked object that includes the markers.

Figure 1:
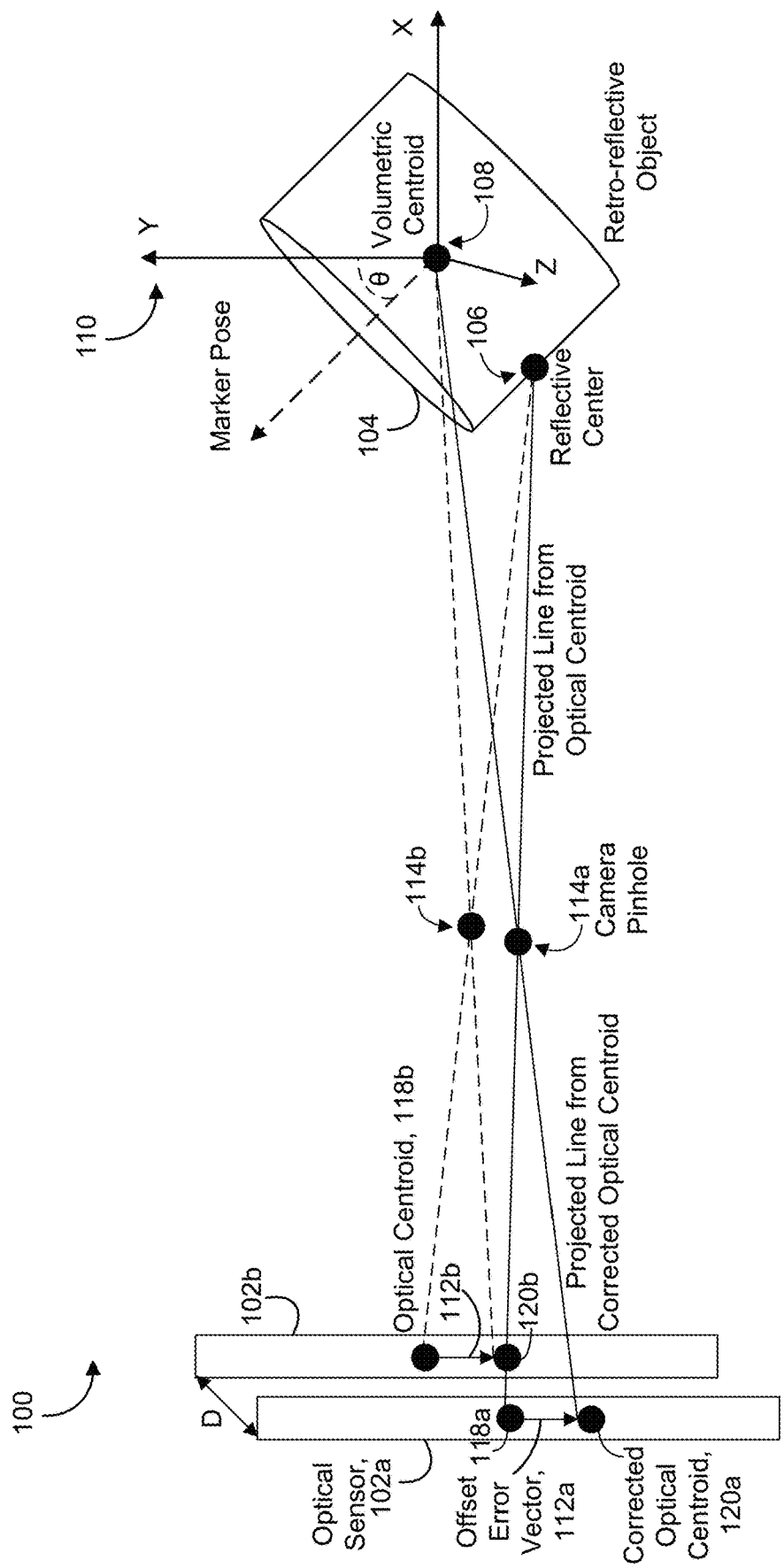
FIG. 1 is a block diagram of an example tracking system for locating a marker.

FIG. 1 shows a diagram of an example tracking system 100 including optical sensors 102*a-b* and at least one marker 104 that is associated with (e.g., connected to) a tracked object (e.g., a medical device such as a surgical scalpel). Generally, the tracked object includes a tracked tool to which markers are attached. As previously stated, this can include a surgical tool. Generally, a passive marker 104 includes a geometrical shape with retro-reflective material applied to a portion of the surface. This can include a sphere, disc, cylinder etc. and is further described below. Generally, an optical signature includes a retro-reflected signal from the markers 104 on a sensor image plane. Generally, an optical centroid 118*a-b* represents a center of mass of the optical signature. The optical centroid 118*a-b* is represented by a 2D value recorded on the image sensor 102*a-b* image plane. An offset error vector 112*a-b* includes an adjustment to be made to the optical centroid 2D location in the image plane. The offset error vector 112*a*, 112*b* thus includes a 2D vector on the sensor 102*a-b* image plane. A corrected optical centroid 120*a-b* includes the optical centroid 118*a-b* value adjusted by the offset error vector 112*a-b*. The corrected optical centroid 120*a-b* is represented by a 2D coordinate value in the sensor image plane. A volumetric centroid 108 is a center of volume of the marker 104 in 3D space. This value is represented by a corrected 3D position of the marker 104 based on the corrected optical centroid 120*a-b* value. The volumetric centroid 108 can be calculated by projecting a line of sight from the corrected optical centroids determined for at least two optical sensors 102*a-b*. A reflective center 106 of the marker represents an example of a 3D location of the marker as measured by uncorrected optical centroids 118*a-b*.

The tracking system 100 is configured to determine the pose of the marker 104 based on an optical signal (not shown) emitted from a location near the optical sensors 102*a-b*. The marker 104 is configured to reflect the optical signal (e.g., infrared light) back towards the optical sensors 102*a-b*.

The optical sensors 102*a-b* of the system can be implemented in various forms, such as a video camera (e.g., a stereoscopic camera) to generate images of the measurement volume. These images are analyzed by a controller associated with the optical sensors 102*a-b* to identify positions of the marker 104 in the images for which image coordinates (e.g., {U, V}, {row, column}, etc.) are calculated to sub-pixel resolution. These image coordinates, such as {U, V} coordinates, from two or more optical sensors 102*a-b* are used to compute the 3D position of the markers in a coordinate system (e.g., a Cartesian "XYZ" coordinate system 110 shown in FIG. 1). For efficient image processing, the system can be designed so that the markers provide very high contrast images, i.e., the markers are very bright relative to the rest of the image. This high contrast is usually achieved by using a retro-reflective material that strongly reflects electromagnetic waves emitted from an illumination source, which can be located near the optical sensors 102*a-b*.

The optical sensors 102*a-b* of the system can be realized in various implementations, for example, the optical sensors 102*a-b* may be part of a single device (e.g., the stereoscopic camera), a group of devices (e.g., an array of cameras), etc. In some implementations, the optical sensors 102*a-b* are part of an image capture unit that includes one or more marker illuminating devices (e.g., electromagnetic waves transmission source). For example, an illuminating device can be paired with each optical sensor. For example, in a stereoscopic camera, two illuminating devices are included. In this example, the illuminating device emits electromagnetic waves (e.g., an optical signal such as infrared or near-infrared light, etc.).

The optical sensors 102*a-b* are generally separated from one another by a known baseline value, marked D in FIG. 1. The optical sensors 102*a-b* each receive the optical signal reflected from the marker 104. The known baseline value D of the at least two optical sensors 102*a-b* is used by the computing system to compute the offset values 112*a-b*, in addition to other parameters of the optical sensors 102*a-b*.

Often, the image-planes of the sensors 102*a-b* are angled a few degrees toward one another. Each sensor 102*a-b* generally includes a CCD/CMOS sensor with a lens or lens stack. Each optical sensors 102*a-b* includes a separate lens stack, and the two sensors are separated (e.g., rigidly, in one unit) by the baseline D to enable estimation of depth/range based on triangulation between them. Thus, in some implementations, there are two sensors mounted rigidly and displaced from one another in one unit. However, this can be extended to multiple cameras cooperating in a shared volume.

The optical signal is directed at a region that includes the marker 104. As subsequently described in relation to FIG. 2 and mentioned above, the marker 104 can be affixed to an object, such as a tool (e.g., a surgical tool, a medical device for treating a patient, etc.). The marker 104 is configured (e.g., covered in a retro-reflective material, have retro-reflective surface features, etc.) so an incident electromagnetic wave is reflected in a retro-reflective manner (e.g., a reflected wave to direct back towards the wave's source with minimal scattering in other directions). The optical sensors 102*a-b* capture an image of the illuminated marker 104. Due to the highly retro-reflective nature of the marker 104, the marker appears as a bright spot in the captured images (e.g., in comparison to other objects within the captured scene), and the tracking system 100 can extract the reflected optical signature of the marker in the image data. The position of the optical centroid 118*a-b* can be determined from this image data, corrected, and the 3D position coordinates (e.g., Cartesian, spherical, cylindrical, etc.) can be estimated from the corrected optical centroids 120*a-b* for each marker.

The marker 104 can often include a cylinder geometry. Additionally, the marker includes a reflective surface. In some implementations, the cylinder is coated with a reflective material. Because of the shape of the cylinder, it is relatively straightforward to wrap a reflective material around the circumference of the cylinder and to cover any useable end circular surfaces of the cylinder with the reflective material without stretching the material. This results in a surface with a low reflective variability and/or high uniformity. The uniformity of the reflective surface of the cylinder results in higher accuracy for optical tracking the cylinder, as previously described. For example, the optical signal reflection is not distorted by variability in the reflective surface.

Other shapes are possible for the marker 104. For example, the shapes can include a circular cylinder with reflective sides only, circular cylinder with a reflective side and a reflective top, a convex conical marker, a concave conical marker, a concave semi-spherical marker, a convex semi-spherical marker, a disc marker, a spherical marker, or any ruled surface. This list is illustrative of the kinds of shapes available for the marker 104, but the list is not exhaustive or limited to the shapes possible for the marker. In an example, for cases except the sphere and disc, compensation is performed for accurate use.

The use of retro-reflective material (e.g., wrapped around a marker) causes the marker to passively reflect a considerable amount of electromagnetic energy (e.g., IR or near-IR light) that is incident upon the marker 104. This electromagnetic energy can be reflected such that most of the reflected energy is directed towards the optical sensor. A retro-reflective material can be considered a material that reflects electromagnetic waves back to its source with a minimum of scattering. For example, an electromagnetic wave (e.g., of a light wave) is reflected back along a vector that is substantially parallel to but opposite in direction from the wave's transmission source.

Continuing with FIG. 1, the marker 104 is in an environment at a position that is a distance away from the optical sensors 102a-b. The position of the marker 104 can be based on the coordinate system 110. Though a Cartesian coordinate system 110 is shown, any coordinate system can be used, including a polar coordinate system, cylindrical or spherical coordinate systems, homogeneous coordinate system, etc. The position of the marker 104 in the coordinate system 110 can be based on various quantities, such as the volumetric centroid 108 of the marker, which is the approximate center of a volume of the marker in 3D space. In this example, the volumetric centroid 108 is used to represent the position of the marker in the coordinate system 110. The tracking system 100 is configured to determine position of the marker 104 by determining the coordinate values of the volumetric centroid 108.

The tracking system 100 is configured to estimate the position of the volumetric centroid 108 of the marker 104. Because the volumetric centroid 108 is within the marker 104, the actual position of the volumetric centroid is not directly viewable by the optical sensors 102a-b. The tracking system 100 is configured to estimate the position of the volumetric centroid 108 based on a position of an optical centroids 118a-b in the image data captured by the sensors 102a-b. The optical centroids 118-ab represents a position, from the perspective of the optical sensors 102a-b, of the marker 104 in space. The optical centroids 118a-b are based on a reflective center 106 of the marker from a perspective of each image sensor 102a-b. The reflective center 106 is the 3D point where rays from the optical centroids, passing through their respective pinholes, approximately cross. This is where the marker would be estimated as located by the system without compensation. The optical centroids 118a-b are the center positions in the optical signals on the image-planes of each of the optical sensors 102a-b. In actuality the position of each marker in space is the volumetric centroid 108, and this set of positions for the markers 104 enable the computation of the pose in tracking the tracked object. When the volumetric centroid 108 is not at the same point as the reflective center 106, from the perspective of the optical sensors 102a-b, the optical centroids 118a-b are offset slightly from the actual positions of where the optical centroids should appear in the image plane. The corrected optical centroids 120a-b represent the actual centers of the markers as if the reflective center 106 were coincident with the volumetric center 108. In other words, the optical centroids area corrected to align with centroids 108, making the optical centroids and their pinholes collinear with centroid 108. In so doing, the reflective center (e.g., the 3D-point approximate-intersection of their rays) is moved to better approximate the location of centroid 108.

For passive markers, the optical signal is generated by reflecting, by the marker, an optical signal emitted from a location near the optical sensors 102a-b. The retroreflective coating of the marker 104 is configured to reflect optical signals on an approximately parallel path back toward the source of the optical signal to generate an optical signature (e.g., optical pattern or optical shape) representing the marker 104. Light is reflected by the marker and received by the optical sensors 102a-b, and the optical sensor provides image data that includes an optical signature of the marker. For example, an optical signature can be extracted from image data captured by a camera. The optical sensors 102a-b are each configured to photograph the environment and capture images of the illuminated marker 104. The illuminated marker 104 forms a shape in the image that can be extracted from the image with filtering or other image processing. The optical centroids 118a-b represents the center of the illuminated marker 104 in the image plane of the image sensors 102a-b.

As shown in FIG. 1, the reflective center 106 is not necessarily coincident with the volumetric centroid 108 for the marker 104 when the marker is not a sphere or circular disc, resulting in the offsets 112a-b of the optical centroids 118a-b. For example, for a cylinder-shaped marker 104, the reflective center 106 and the volumetric centroid 108 are aligned when the disc is viewed from a position on the cylinder's axis, viewing the top circular surface, or from a position in the plane normal to the axis and at its mid-point, viewing the rectangular aspect of its side. However, when the cylinder is tilted, as shown in FIG. 1, the viewing angle $\theta$ increases. As the angle $\theta$ increases, the volumetric centroid 108 and reflective center 106 are further apart when viewed from the optical sensors 102a-b. The distance between the volumetric centroid 108 and the reflective center 106 results in an offset 112a-b on the respective optical sensors 102a-b between the optical centroids 118a-b and positions of corrected optical centroids 120a-b in the 2D image plane where the optical centroids would be if the reflective center 106 were coincident with the volumetric centroid 108 for each marker. The exact offset values 112a-b can depend on the configuration of a camera including a position of pinhole(s) 114a-b or lens(es) of the camera(s). The tracking system is configured to determine these offset error vectors 112a-b and thus the positions of the corrected optical centroids 120a-b. A similar compensation is performed for other geometric values besides $\theta$, such as a range, azimuth, elevation, and roll of the marker 104.

The distance between the volumetric centroid 108 and the reflective center 106 (and the resulting error offset values 112a-b) can vary depending on the exact parameters of the marker 104. For example, a size of the marker 104, shape of the marker, distance of the marker from the sensor, and viewing angle of the marker with respect to the optical sensors 102a-b can affect the displacement of the volumetric centroid 108 from the reflective center 106 and subsequently the error offset vector 112a-b values. Some of these parameters are at least initially unknown during tracking, including the distance of the marker 104 with respect to the optical sensors 102a-b and the viewing angle $\theta$ of the marker with respect to the sensor. The tracking system 100 can determine these values during tracking, in one embodiment, by approximating the pose of the tracked object, based on reflective centers 106 and tracking-system parameters.

Figure 2:
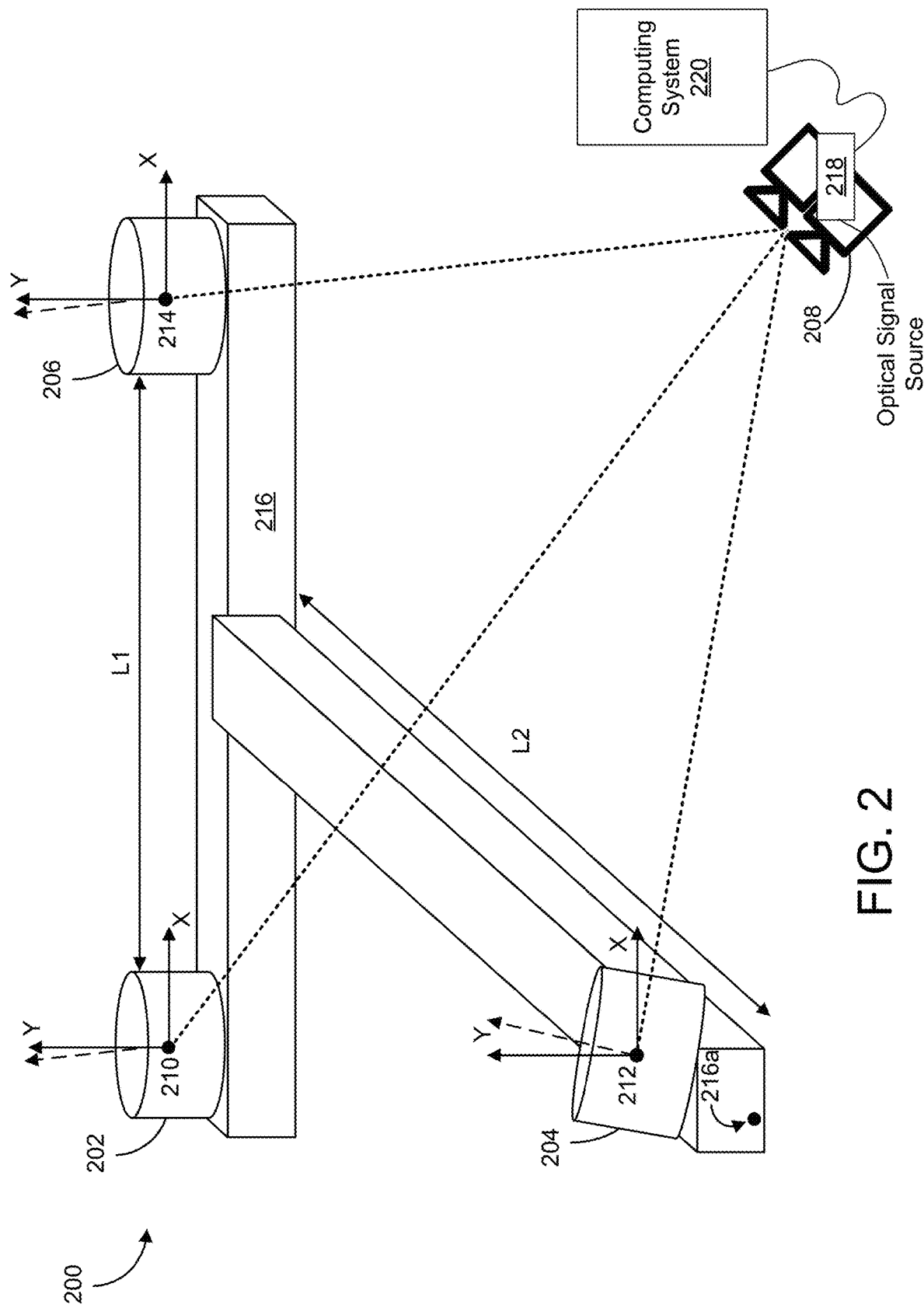
FIG. 2 is a perspective view of an example tracking system for determining a pose of a tracked object with three markers.

Referring to FIGS. 1-2, a general tracking process is now described. FIG. 2 shows an example tracking system 200 including a tracked object 216, markers 202, 204, and 206, a camera 208, an optical signal source 218, and a computing system 220. The tracking system 200 is configured to determine the position of the tracked object 216 in an environment by determining the pose of each marker 202, 204, and 206.

The sensors 102a-b, which can be a part of a camera system and include a sensing device such as a CCD or CMOS optical sensor, can capture reflected electromagnetic waves (e.g., optical signals) from a working volume including a tracked object. The image sensors 102a-b each generate images of the working volume and particularly of the markers on the tracked object 216, such as markers 202, 204, and 206. The optical signals can be emitted by one or more signal generators 218 (e.g., light emitting diodes (LEDs), array of LEDs, or any other such source of IR) that is placed near the sensors of camera 208.

The images obtained by the optical sensor(s) generally include optical signatures of the markers 202, 204, and 206. Images captured by the camera 208 can be analyzed by a processing device of the computing system 220, which contains appropriate image analysis software. Due to the highly retro-reflective nature of the markers 202, 204, and 206, at certain wavelengths of electromagnetic waves, the markers appear as bright spots (the optical signatures) in the captured images. This is because the markers 202, 204, and 206 are each coated in a reflective material that illuminates in response to the optical signal emitted by the source(s) 218. The optical signatures appear as shapes in the images, and can be extracted from the images with image processing.

The tracking system 200 determines the optical centroid 118a-b for each of the bright spots in the images. The known parameters of the image sensors 102a-b, such as the baseline, lens parameters, and so forth, are combined with the optical centroids 118a-b data to generate initial pose estimates of the markers 202, 204, and 206.

Generally, each marker is associated with at least two images, and the image sensors capture at least two markers in the tracking region. The predetermined relationships of the markers with respect to one another, such as the distances L1 and L2, are used to identify the optical centroids associated with each marker, and compute the reflective centers as the initial pose estimates for the pose 210, 212, and 214 of each respective marker 202, 204, and 206 from the optical centroids 118a-b. These pose estimates can be represented in 3D space.

The computing system 220 estimates an error offset vector 112a-b for the optical centroids 118a-b for each marker 202, 204, and 206. The error offset vectors 112a-b for each marker 202, 204, and 206 are indicative of a difference between the observed optical centroid values 118a-b for each marker represented by the center of reflection 106 and the true optical centroid values 120a-b. The true optical centroid values 120a-b are positions in the 2D image plane of each image sensor 102a-b where the optical centroid would be if the reflective center of the marker were coincident with the volumetric centroid of the marker.

In order to compensate for the error patterns of a cylindrical marker, the following input parameters can be used. A physical knowledge of the tracking system 200 is known prior to tracking, including camera 208 parameters. For example, a relative six degree of freedom (6DOF) geometry between each of the optical sensors (e.g., two optical sensors) is known. The lens parameters, including a focal length, center location on the sensor, distortion parameters, and so forth, are known and saved in the configuration file. A relative geometry between the illumination source(s) 281 and pinhole(s) 114 of the camera is known. Generally, the camera 208 includes at least two optical sensors. In this example, the initial pose of the markers 202, 204, and 206 from the camera can be determined based on the markers 202, 204, 206 between two images captured by two of the sensors, in addition to the parameters of the camera and the measured optical centroids 118a-b.

In addition parameters of the camera 208 and light source 218, the computing system 220 can be loaded with configuration data including a physical description of each of the retroreflective markers 202, 204, and 206. For example, when the markers are cylinders, the computing device is loaded with a diameter of each cylinder, a height of each cylinder, a configuration of coverage of retro-reflective material on each marker (e.g., a side-only or top included coverage). A retro-reflective intensity as a function of angle parameter (e.g., incident angle) can be known. The configuration data can include data describing whether the markers 202, 204, and 206 are identical, unique, or somehow varying and which marker is associated with which marker parameters. The configuration data can include an initial estimate of retro-reflective marker positions and orientations relative to one another. Generally, this information is obtained from an initial measurement or CAD data.

The parameters of the camera system and of the markers constitute an error model. In other words, the error model is based on the known physical parameters of the tracking system. For example, the optical sensor configuration parameters are included in the model. These parameters include one or more of a lens size, a focal length, and an optical sensor position in the environment for the at least two optical sensors. The tracking system estimates the offset error vectors 112a-b of the respective markers 202, 204, and 206 based on some means of estimating initial marker poses, and on these optical sensor configuration parameters and the physical parameters of the markers.

In some implementations, the computing system 220 obtains data specifying an initial position of the one or more of the markers to assist in determining the position of the marker 202, 204, 206 in the environment. If this data are available, the computing system 220 estimates the offset error vectors 210, 212, 214 based on the data specifying the initial pose of the at least one marker. For example, the tracking system 200 can include an inertial measurement unit (IMU) that provides orientation data representing an orientation for a marker of the plurality of markers. The computing system 220 is configured to estimate the initial orientation of the markers 202, 204, and/or 206 based on orientation data provided by the IMU.

In some implementations, estimating the initial pose of a marker 202, 204, 206 in the environment includes knowledge of a predetermined spatial relationship between the markers 202, 204, and 206. In this example, the markers 202, 204, 206 are rigidly fixed relative to each other. The computing system 220 is configured to extract, from the image data, the optical signatures representing reflections of the optical signal from the markers 202, 204, 206. Based on these optical signatures and their positions in the images, the computing system can estimate the initial pose of the markers 202, 204, 206 in the environment.

The error model also includes data describing the markers 202, 204, 206. Determining the offset error vector by the computing system 220 includes analyzing on one or more parameters of the markers 202, 204, and/or 206. The parameters can include a size of each of the markers 202, 204, 206, shapes of each marker, a relative position of the markers with respect to one another, and a configuration of a reflective coating on the at least one marker. The computing system 220 uses the error model to determine the offset error vectors 112a-b for each marker 202, 204, and 206 on the tracked object. The data input to the error model are initial estimates of marker orientation and position—the latter in support of range, azimuth, elevation, pitch and roll of the markers.

The computing system 220 determines the corrected optical centroids 120a-b for each marker based on the calculated offset error vectors 112a-b for each marker. The corrected optical centroids 120a-b represent an offset in the 2D image plane from the measured optical centroids 118a-b, the offset being the offset error vectors 112a-b.

The computing system 220 determines a corrected pose value for each of markers 202, 204, and 206. The computing system 220 uses the known parameters of the camera, of each of the markers 202, 204, and 206, and of the markers together in the system to calculated a pose 210, 212, and 214 for each respective marker 202, 204, and 206.

Given the locations of the cameras 208 (e.g., of a stereoscopic camera or a camera with at least two optical sensors) the locations of the retro-reflective markers 202, 204, and 206, the computing system 220 calculates a pose of the tracked device 216. In some implementations, the position representing the tracked object 216 can represent a tool tip 216a of the tracked object. In some implementations, the position representing the tracked object 216 in space can represent a center of the tool, an edge, or any other portion of the tracked object based on configuration data preloaded into the computing system 220. In other words, while 216a is shown in a particular location, any part of the tracked object 216 can be discerned from the positions of the markers 202, 204, 206, once determined. For example, a point or center of a spherical stylus can be represented by point 216a.

In an aspect, the tracked object 216 can include any object to be tracked by the tracking system 200, but generally includes objects that are rigid or semi-rigid such that the markers 202, 204, and 206 do not move relative to one another in space during tracking. The tracked object 216 is generally configured to support a plurality of markers 202, 204, 206. The tracked object 216 is generally coupled to a plurality of markers (e.g., two markers, three markers, etc.). Additional markers can be added. During tracking, generally a plurality of the markers are visible to the camera 208. In some implementations, the tracked device 216 includes a tool for performing surgical tasks. In some implementations, the tracked device 216 includes an object to be presented in a virtual reality or augmented reality environment.

In the depicted example, the computing system 220 is connected to the camera 208 (or array of two or more cameras) via at least one communication link. In other examples, the computing system 220 is located within a camera mounting unit. The computing system 220 includes a processing device. The computing system 220 can include one or more of various forms of digital computers, including, e.g., laptops, desktops, workstations, personal digital assistants, servers, blade servers, mainframes, and other appropriate computers. The computing device is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Figure 3:
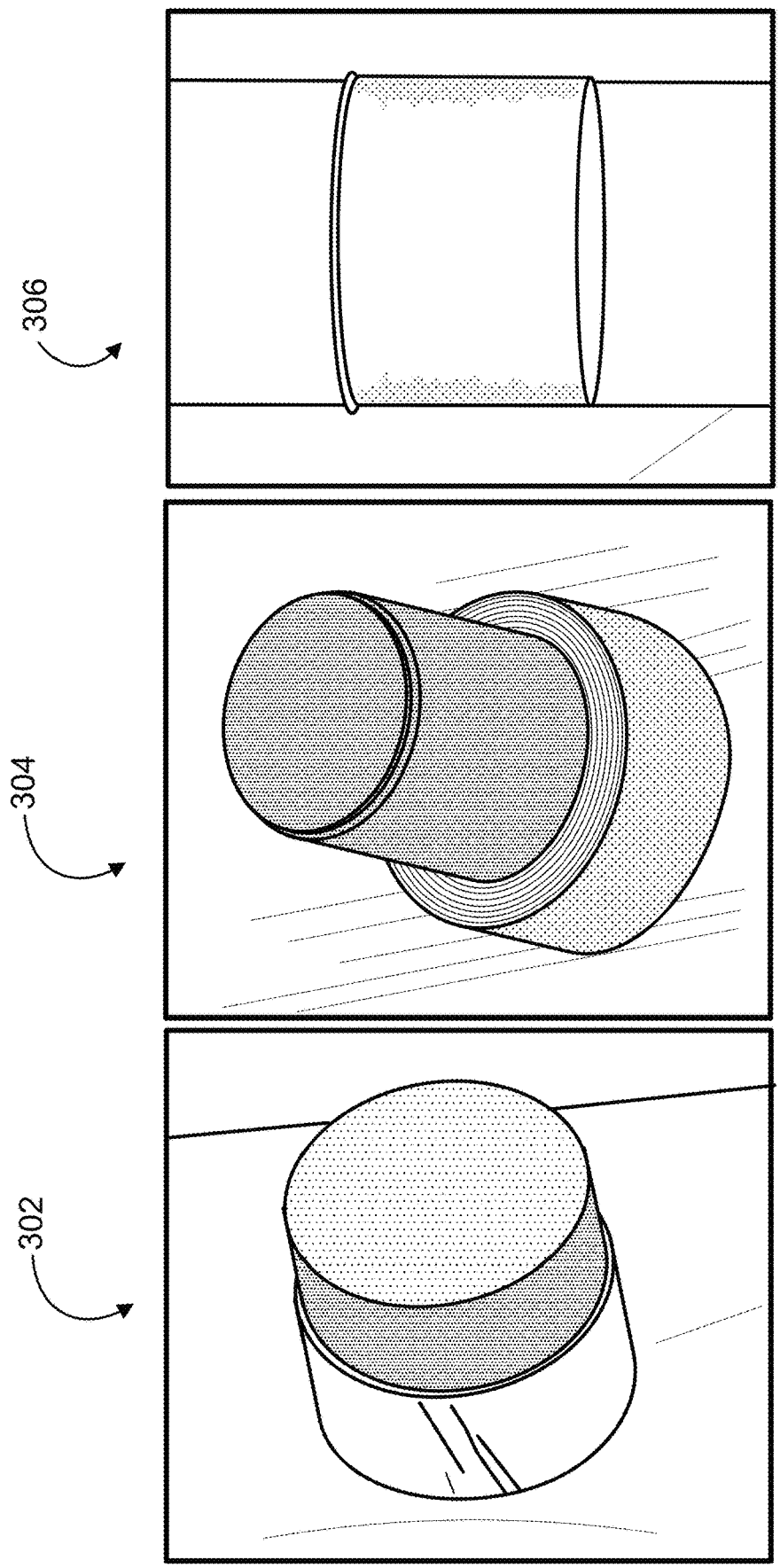
FIG. 3A includes an example of a retroreflective marker.
FIG. 3B includes an example of a retroreflective marker.
FIG. 3C includes an example of a retroreflective marker.

FIGS. 3A-3C show examples of markers 302, 304, and 306 for use in the tracking systems 100, 200. For example, markers 104, 202, 204, and 206 of FIGS. 1 and 2 can include any one of markers 302, 304, or 306 of FIGS. 3A-3C. In FIG. 3A, marker 302 includes a cylinder with retroreflective material on both top and the side in a continuous manner. In FIG. 3B, marker 304 includes a cylinder with retroreflective material on both the top and the side in a discontinuous configuration. FIG. 3C shows a marker 306 including a cylinder with a retroreflective material on a side of the marker only.

Various techniques for providing a retroreflective marker are possible. The marker can be covered with a coating or reflective materials for the retro-reflection. The coating can include a reflective film or surface. In another example, the coating can incorporate reflective objects having different geometries, shapes, etc. For example, retro-reflection can be induced using microprisms, microspheres, or any other technology that supports retro-reflection. In some implementations, the optical signal may not reside in the visible spectrum, but instead may be located in the infrared spectrum (or other regions of the electromagnetic spectrum.) For example, the signal may include a wavelength approximately between 700-1000 nanometers.

In some implementations, a material in the optical path through the marker may provide one or more absorption peaks one or more wavelengths. That material can be, for example, an outer coating over a retro-reflective layer, a material of the retro-reflective layer itself, such as the material of glass microspheres or the base material of microprisms, etc. In certain embodiments, the material is doped with a doping agent to provide one or more absorption peaks for one or more wavelengths.

The markers may be made of various materials, shapes, sizes, or coatings to achieve the retro-reflectivity. In some implementations, the coating or reflective material includes particles of solid glass that are each approximately spherical in shape. The solid glass beads can have diameters of approximately 20-200 micrometers (µm). In some implementations, the particles include rear surfaces in optical association with a specular reflector. The reflector can be a metallic coating, (e.g., a copper based coating) or a non-metallic thin film stack designed to reflect electromagnetic waves. Generally, the reflective material is uniformly applied to the rear surface of the particles that coat the marker.

The circular cylinders of FIGS. 3A-3C are non-limiting examples of possible shapes of the markers. The markers can include various regular and irregular shapes (e.g., disc, cube, and sphere.) Other shapes can include cones, circular cylinders, conics, or any object having a ruled surface.

Figure 4:
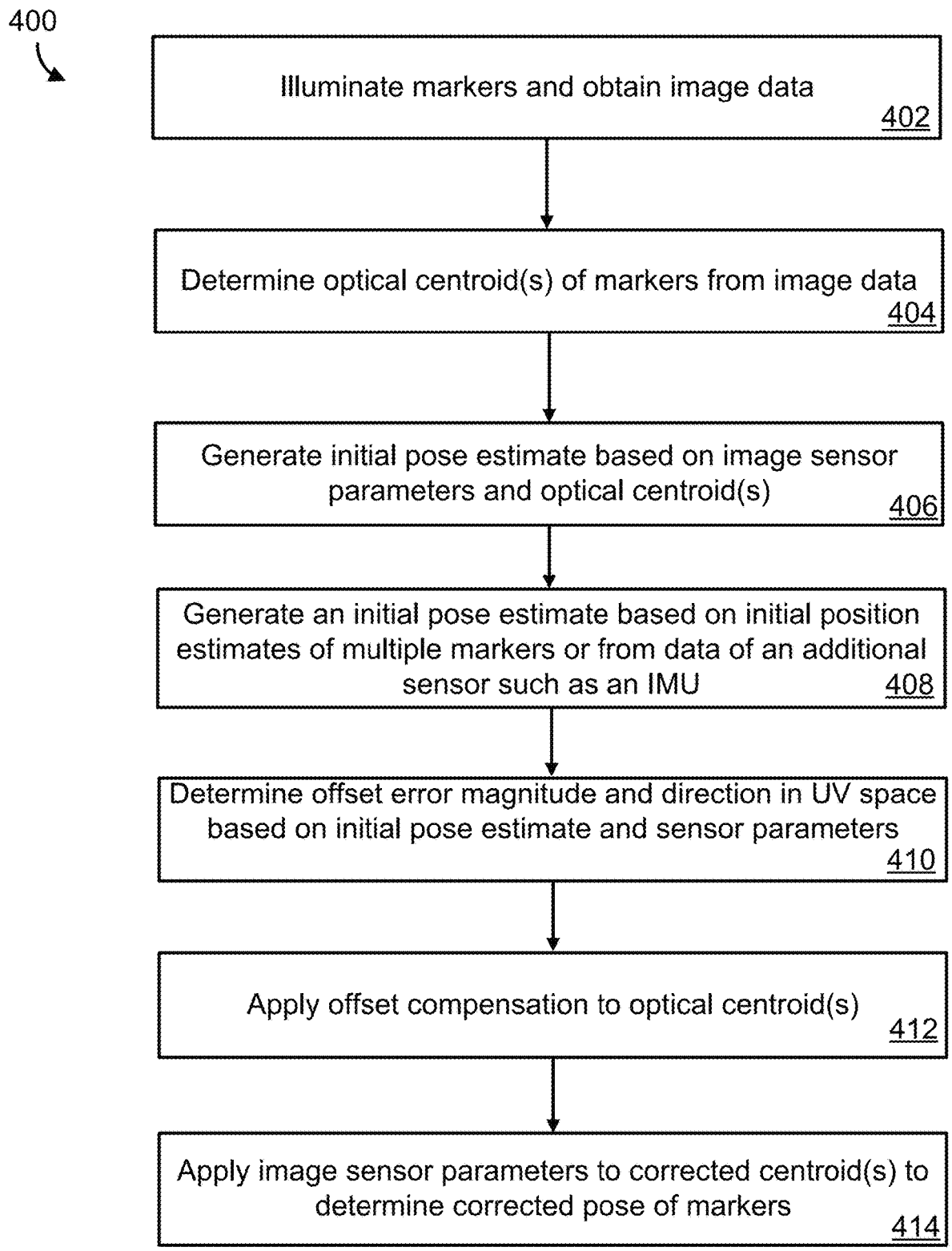
FIG. 4 shows an example process for performing three dimensional tracking.

FIG. 4 shows a flow diagram representing an example process 400 for locating a marker by a tracking system (e.g., tracking system 200 of FIG. 2). The process 400 includes illuminating (402) the markers of the tracking system and obtaining image data including the illuminated markers. The tracking system is configured to determine (404) optical centroids of the markers from the image data. The optical centroids can be denoted in {U, V} coordinates for each marker. The tracking system is configured to estimate (406) an initial pose in 3D (e.g., Cartesian) coordinates based on parameters of the camera from the optical centroids determined for each of the images obtained by the image sensors.

The tracking system is configured to use an iterative compensation process. Generally, the tracking system is calibrated based on the specific parameters of the markers of the tracked object, including their sizes, shapes, orientations, relative positions on the tracked object, and their reflective properties. When the object tracking begins, the tracking system does not require knowledge of an initial pose of the markers. Rather, an initial pose estimate is made based on images of the markers, their positions with respect to one another, and the parameters of the image sensors. In some implementations, the tracking system generates (408) an initial pose estimate using data from multiple markers or from data of an additional sensor such as an IMU.

The tracking system determines (410) offset error magnitude and direction in the {U, V} space for the optical centroid for each marker. As previously described, the configuration data and initial pose are used to estimate the error offset vectors of the optical centroids in the image data for each marker.

The tracking system is configured to perform (412) offset compensation on each of the optical centroids of the markers to determine the corrected optical centroids in the image plane of each image. This includes applying the determined error magnitude and direction to the optical centroid. Generally, the offset is performed in the {U, V} coordinate space to adjust the optical centroids to represent the corrected optical centroids of the markers in the two dimensional image space, as previously described. The corrected optical centroids are used to determine the pose of the markers in 3D space.

The tracking system applies (414) the parameters of the optical sensor (as previously described) to the corrected optical centroids to determine the corrected pose for each marker. The corrected pose for each of the markers is represented in 3D space. The particular values of the coordinates are based on the optical sensor parameters. In some implementations, the optical sensor can represent the origin for the 3D coordinate system, or some other reference point of the coordinate system in which the pose of each of the markers is determined. The tracking system determines pose of the tracked object from the corrected pose of each of the markers, as the relative positions and orientations of the markers on the tracked object are known. From this information, a position, orientation or both of a particular point of the tracked object (e.g., a working tip of a surgical tool) can be determined and presented to a user on a user interface of the tracking system or a related computing system in communication with the tracking system.

The tracking system is configured to iterate the estimation process by using the corrected pose estimate as the initial pose estimate for pose compensation in a subsequent iteration on that same image data. The corrected pose estimate becomes increasingly accurate as the offset error vectors calculations for the optical centroids are improved in each iteration. This results in a more accurate determination of a pose of the tracked object to which the markers are affixed.

A number of implementations of the invention have been described. Nevertheless, it will be understood that various modifications may be made without departing from the spirit and scope of the invention. For example, the position of markers and tracked object can change with time. The computing device may be configured to automatically detect which bright spots in an image identified as marker reflections at a first time and at first positions correspond to identified marker reflections at a second time and at second positions. Accordingly, other implementations are within the scope of the following claims.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, tracking systems 100 and 200, and the computing system 220, can be implemented using digital electronic circuitry, or in computer software, firmware, or hardware, or in combinations of one or more of them. In another example, the process 400 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, discs, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, computing system 220 includes a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical discs, or optical discs. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic discs (e.g., internal hard discs, removable discs, and others), magneto optical discs, and CD-ROM and DVD-ROM discs. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 5:
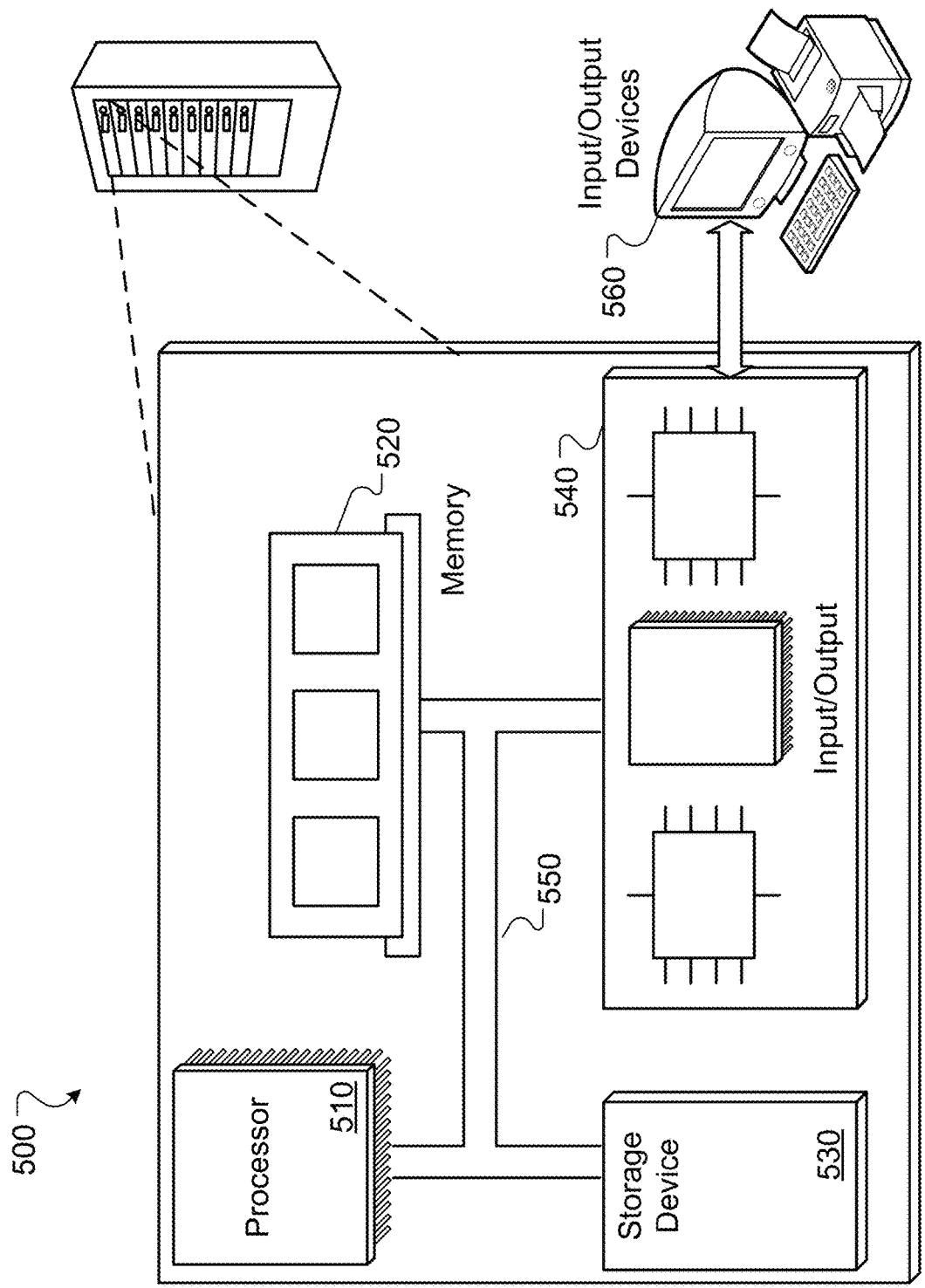
FIG. 5 is a diagram of an example computing system.

FIG. 5 shows an example computer system 500 that includes a processor 510, a memory 520, a storage device 530 and an input/output device 540. Each of the components 510, 520, 530 and 540 can be interconnected, for example, by a system bus 550. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Thus, specific embodiments of the optical tracking system and retro-reflective marker and methods for using the optical tracking system to track retro-reflective markers have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

What is claimed is:

1. A tracking system for tracking one or more reflective markers, the tracking system comprising:
   at least two optical sensors configured to obtain image data of an environment that includes at least one marker, wherein at least a portion of the at least one marker is configured to reflect an optical signal; and
   a processing device configured to obtain the image data from the at least two optical sensors, the processing device configured to perform operations comprising:

extracting, from the image data, optical signatures representing reflections of the optical signals of the at least one marker;

determining optical centroids of the optical signatures in the image data;

estimating an initial pose of at least one marker in the environment based on the optical centroids;

determining offset error vectors from the optical centroids of the at least one marker based on the estimate of the initial pose;

determining corrected optical centroids of the at least one marker based on the offset error vectors and the optical centroids; and determining a corrected three-dimensional (3D) position of the at least one marker in the environment based on the corrected optical centroids of the at least one marker.

2. The tracking system of claim 1, wherein estimating an initial pose of the at least one marker in the environment based on the optical centroids comprises:

obtaining one or more optical sensor configuration parameters comprising one or more of a lens size, a focal length, and an optical sensor position in the environment for the at least two optical sensors; and estimating the offset error vectors of the markers of the at least one marker in the environment based on the one or more optical sensor configuration parameters.

3. The tracking system of claim 1, wherein the at least one marker is a first marker, and wherein estimating the initial pose of the at least one marker in the environment comprises:

receiving spatial data representing a predetermined spatial relationship between the first marker and one or more additional markers of a plurality of markers, the first marker and the one or more additional markers being rigidly fixed relative to each other on a tracked object;

extracting, from the image data, optical signatures representing reflections of the optical signal from the one or more additional markers; and based on the optical signatures of the one or more additional markers and the predetermined spatial relationship between the first marker and the one or more additional markers, estimating the initial pose of the first marker in the environment.

4. The tracking system of claim 1, further comprising an inertial measurement unit (IMU) configured to provide orientation data representing an orientation for the at least one marker; and wherein estimating the initial pose of the at least one marker is based on orientation data provided by the IMU.

5. The tracking system of claim 1, wherein determining the offset error vectors is further based on one or more parameters of the at least one marker, the one or more parameters comprising, for a given marker, a size of the given marker, a shape of the given marker, a relative position of the given marker with respect to at least one other marker if a plurality of markers are present, and a configuration of a reflective coating on the given marker.

6. The tracking system of claim 1, wherein the operations further comprise:

using the corrected three-dimensional position as a portion of the initial pose of the at least one marker in the environment; and determining the offset error vectors based on the corrected three dimensional position of the at least one marker by an iterative process.

7. The tracking system of claim 1, wherein the operations further comprise:

based on the corrected three dimensional position of the at least one marker, determining a pose of a portion of a tracked object in the environment, wherein the at least one marker is fixed to the tracked object at predetermined locations on the tracked object.

8. The tracking system of claim 7, wherein the tracked object is a surgical tool, and wherein the portion of the tracked object is a working portion of the surgical tool.

9. The tracking system of claim 1, wherein the at least one marker comprises one of a circular cylinder with reflective sides only, circular cylinder with a reflective side and a reflective top, a convex conical marker, a concave conical marker, a concave semi-spherical marker, a convex semi-spherical marker, a disc marker, any marker having a ruled surface, and a spherical marker.

10. The tracking system of claim 1, wherein the at least one marker is one of a plurality of markers that are identical or nearly identical to each other in size or shape.

11. The optical tracking system of claim 1, wherein the at least one marker is one of a plurality of markers that are each unique from at least one other marker in the plurality in size or shape.

12. The optical tracking system of claim 1, wherein the optical signal comprises infrared (IR) or near IR radiation.

13. A method performed by a computing system for tracking one or more reflective markers, the method comprising:

obtaining, from at least two optical sensors, image data of an environment that includes at least one marker, wherein at least a portion of the at least one marker is configured to reflect an optical signal;

extracting, from the image data, optical signatures representing reflections of the optical signal reflected by the at least one marker;

determining optical centroids of the optical signatures in the image data;

estimating an initial pose of the at least one marker in the environment based on the optical centroids;

determining offset error vectors from the optical centroids associated with the at least one marker based on the estimate of the initial pose;

determining corrected optical centroids associated with of the at least one marker based on the offset error vectors and the optical centroids; and determining a corrected three-dimensional (3D) position of the at least one marker in the environment based on the corrected optical centroids associated with the at least one marker.

14. The method of claim 13, wherein estimating an initial pose of the at least one marker in the environment based on the optical centroids comprises:

obtaining one or more optical sensor configuration parameters comprising one or more of a lens size, a focal length, and an optical sensor position in the environment for the at least two optical sensors; and estimating the offset error vectors based on the one or more optical sensor configuration parameters.

15. The method of claim 13, wherein the at least one marker is a first marker, and wherein estimating the initial pose of the at least one marker in the environment comprises:

receiving spatial data representing a predetermined spatial relationship between the first marker and one or more additional markers of a plurality of markers, the first marker and the one or more additional markers being rigidly fixed relative to each other on a tracked object;

extracting, from the image data, optical signatures representing reflections of the optical signal from the one or more additional markers; and based on the optical signatures of the one or more additional markers and the predetermined spatial relationship between the first marker and the one or more additional markers, estimating the initial pose of the first marker in the environment.

16. The method of claim 13, further comprising:

providing, by an inertial measurement unit (IMU), orientation data representing an orientation for the at least one marker, wherein estimating the initial pose of the at least one marker is based on orientation data provided by the IMU.

17. The method of claim 13, wherein determining the offset error vectors is further based on one or more parameters of the at least one marker, the one or more parameters comprising, for a given marker, a size of the given marker, a shape of the given marker, a relative position of the given marker with respect to at least one other marker if a plurality of markers are present, and a configuration of a reflective coating on the given marker.

18. The method of claim 13, further comprising:

using the corrected three dimensional position as a portion of the initial pose of the at least one marker in the environment; and determining the offset error vectors based on the corrected three dimensional position of the at least one marker by an iterative process.

19. The method of claim 13, further comprising:

based on the corrected three dimensional position of the at least one marker, determining a pose of a portion of a tracked object in the environment, wherein the at least one marker is fixed to the tracked object at predetermined locations on the tracked object.

20. One or more non-transitory computer readable media storing instructions that, when executed by a computing system, cause the computing system to perform operations comprising:

obtaining, by at least two optical sensors, image data of an environment that includes at least one marker, wherein at least a portion of the at least one marker is configured to reflect an optical signal;

extracting, from the image data, optical signatures representing reflections of the optical signal reflected by the at least one marker;

determining optical centroids of the optical signatures in the image data;

estimating an initial pose of the at least one marker in the environment based on the optical centroids;

determining offset error vectors from the optical centroids associated with the at least one marker based on the estimate of the initial pose;

determining corrected optical centroids associated with the at least one marker based on the offset error vectors and the optical centroids; and determining a corrected three dimensional (3D) position of the at least one marker in the environment based on the corrected optical centroids associated with the at least one marker.

* * * * *

UNITED STATES PATENT AND TRADEMARK OFFICE
CERTIFICATE OF CORRECTION

| | | |
|---|---|---|
| PATENT NO. | : 12,039,751 B2 | Page 1 of 1 |
| APPLICATION NO. | : 17/529881 | |
| DATED | : July 16, 2024 | |
| INVENTOR(S) | : Larry Chen et al. | |

It is certified that error appears in the above-identified patent and that said Letters Patent is hereby corrected as shown below:

On the Title Page

Column 1, item (73) Assignee, Line 1, delete "Inc." and insert --Inc., Waterloo (CA)--.

In the Claims

Column 20, Line 45, Claim 13, after "with" delete "of".

Signed and Sealed this
Twenty-fourth Day of September, 2024

Katherine Kelly Vidal
*Director of the United States Patent and Trademark Office*